United States Patent [19]

Webster et al.

[11] Patent Number: 4,463,259

[45] Date of Patent: Jul. 31, 1984

[54] METHOD AND APPARATUS FOR MEASURING THE DISPLACEMENT OF A RADIATION-RESTRICTIVE MARK, AS IN A SURVEYING INSTRUMENT

[76] Inventors: Peter-John Webster, 339 West Ave, Ferndale; James B. Roulston, 14 Beech St., Bryanston Extension 3, both of Randburg, South Africa

[21] Appl. No.: 357,652

[22] Filed: Mar. 12, 1982

[51] Int. Cl.³ .................................................. G01D 5/40
[52] U.S. Cl. ............................. 250/338; 250/231 SE; 250/349
[58] Field of Search ......... 250/338, 340, 349, 231 SE; 340/347 P

[56] References Cited

U.S. PATENT DOCUMENTS 3,255,357 6/1966 Kapany et al. ...................... 250/227
4,101,882 7/1978 Kramer ........................... 340/347 P

OTHER PUBLICATIONS

J. J. Hamrick and B. E. Wendling, "Optical Displacement Measuring Device", *IBM Technical Disclosure Bulletin*, vol. 4, No. 7, (Dec. 1961), p. 85.

*Primary Examiner*—Janice A. Howell
*Assistant Examiner*—Constantine Hannaher
*Attorney, Agent, or Firm*—Stevens, Davis, Miller & Mosher

[57] ABSTRACT

The invention provides a method of measuring comprising: directing sources of electro-magnetic radiation, having a predetermined displacement relative to each other in a direction of measurement, to radiate over the receiving areas of electromagnetic radiation sensors also having a predetermined displacement relative to each other in a direction of measurement; sequentially switching the sources; moving a mark between the sources and the sensors, the mark causing a restriction in a cross-section measurement of the radiation passing beyond it, and the mark moving in a direction of measurement from a reference position to a position determined by the measurement being taken; detecting any changes in the sensors as a result of movement of the radiation restriction caused by movement of the mark and the switching of the sources; noting between the switching of which sources each such change occurred; and ascertaining what distance the radiation restriction moved to cause the change to occur between the noted sources.

12 Claims, 8 Drawing Figures

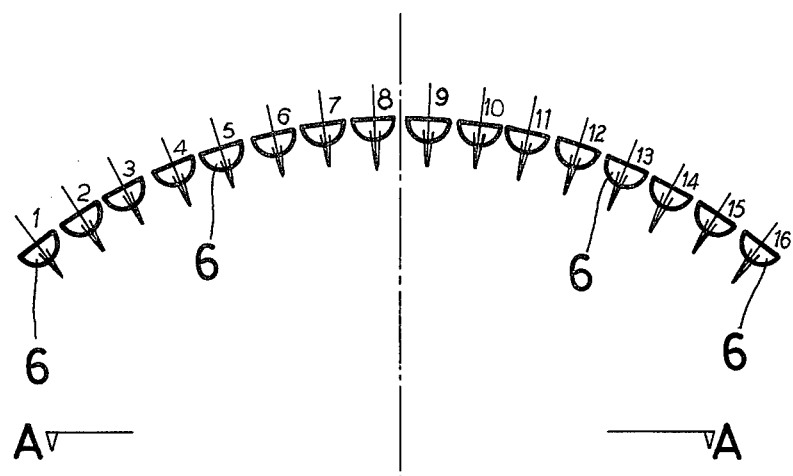
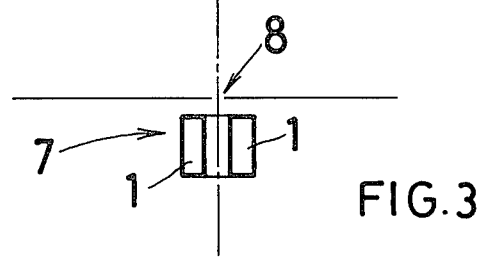
FIG.3
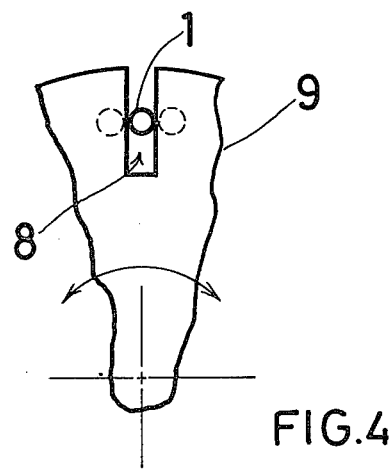
FIG.4

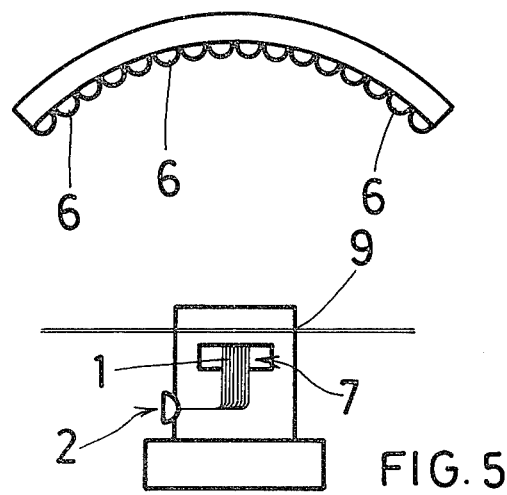
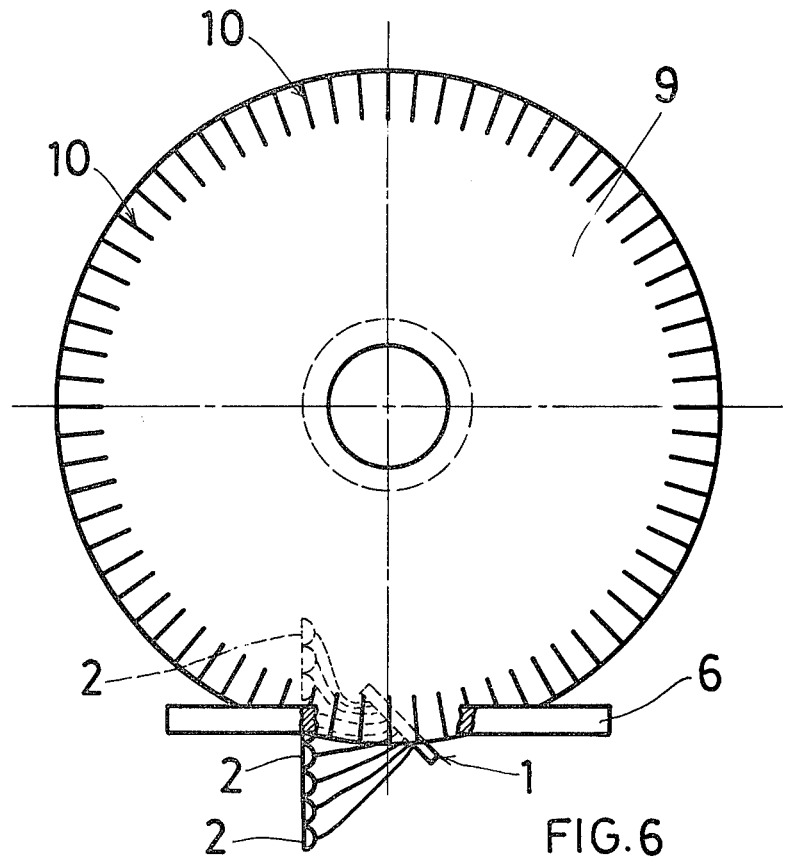

METHOD AND APPARATUS FOR MEASURING THE DISPLACEMENT OF A RADIATION-RESTRICTIVE MARK, AS IN A SURVEYING INSTRUMENT

BACKGROUND TO THE INVENTION

This invention relates to a measuring method and apparatus therefor and more particularly to such method and apparatus for measuring planar distances, angular or otherwise, between graduated marks on scales.

The reading of scales used to measure such distances to a relatively high degree of accuracy demanded in, say, surveying applications, requires the operator of the instrument to have a certain basic skill and experience, and can be time consuming.

OBJECT OF THE INVENTION

It is an object of this invention to provide a measuring method and apparatus from which a measurement taken can be read out automatically without reading the measurement off a scale by eye.

SUMMARY OF THE INVENTION

According to this invention a method of measuring comprises the steps of:
  directing a plurality of sources of electro-magnetic radiation, having a predetermined displacement relative to each other in a direction of measurement, to radiate over the receiving areas of a plurality of electro-magnetic radiation sensors also having a predetermined displacement relative to each other in a direction of measurement;
  sequentially switching the sources;
  moving at least one mark between the sources and the sensors, the mark causing a restriction in a cross-section measurement of the radiation passing beyond it, and the mark moving in a direction of measurement from a reference position to a position determined by the measurement being taken;
  detecting any changes in the sensors as a result of movement of the radiation restriction caused by movement of the mark and the switching of the sources;
  noting between the switching of which sources each such change occurred; and,
  ascertaining what distance the radiation restriction moved to cause the change to occur between the noted sources.

Further features of this method provide for the sources to be in the same line as the direction of measurement, and to be arranged in an arcuate fashion above the sensors, and for the sources to be switched in the sequence of their location in the line.

There is also provided for the sources and sensors to be adapted such that the sensors will indicate an 'on' condition should radiation falling thereon cover half or more of a sensor's receiving area and for the sensor to otherwise indicate an 'off' condition.

Preferably the direction, positive or negative, of change of sensors in a particular measuring direction will also be noted.

The invention also provides measuring apparatus for effecting the above method comprising:

a plurality of sources of electro-magnetic radiation having a predetermined displacement relative to each other in a direction of measurement;
  a plurality of electro-magnetic radiation sensors having a predetermined displacement relative to each other in a direction of measurement;
  means adapted to sequentially switch the sources;
  at least one moveable mark adapted to move in a direction of measurement between said sources and sensors from a reference position to a position determined by the measurement being taken, the mark being further adapted to cause a restriction in a cross-sectional measurement of the radiation passing beyond it in use; and
  detection means adapted to detect any changes in the sensors as a result of movement of the radiation restriction caused by movement of the mark and the switching of the sources; the arrangement being such that the sources are directed to radiate over the receiving areas of the sensors.

Preferably the sensors comprise optical fibres having co-planar radiation receiving ends and leading away therefrom to photo-sensitive electronic components. Further, where a plurality of graduated moveable marks are used the sensors will at least extend across the distance between any two adjacent marks.

There is also provided for the sensors to extend at an acute angle to the shortest line between two marks and to also include other such arrangements for increasing the number of sensors in a length equivalent to the said line between two marks, the aforegoing methods of increasing the number of sensors between marks being more fully described in, and forming the subject matter of, our co-pending South African patent application No. 79/1966 of Apr. 24, 1977 entitled "Method of and Apparatus for determining the location of a graduated mark for measuring".

Still further each mark is preferably a straight graduated line having clearly defined sides and being substantially opaque to the radiation used. This radiation preferably has a wavelength falling in the spectrum commonly known as 'infra-red' light, and the sensors are preferably infra-red light emitting diodes.

There is also provided for electronic circuitry to perform the function of detecting as well as further required calculations, and to display the measured quantity on a display.

The above, and further features of the invention will become more apparent from the description below, by way of example only, of preferred embodiments of the invention.

BRIEF DESCRIPTION OF THE DRAWINGS

In this description reference is made to the accompanying drawings in which:

FIG. 3 is an illustrative side view of measuring apparatus;

FIG. 4 is a plan view of the apparatus in FIG. 3 taken along line A—A;

FIG. 5 is an illustrative side view of an alternative embodiment of apparatus according to the invention;

FIG. 6 is a sectional plan view of the apparatus in FIG. 5;

DETAILED DESCRIPTION OF THE DRAWINGS

Figure 1:
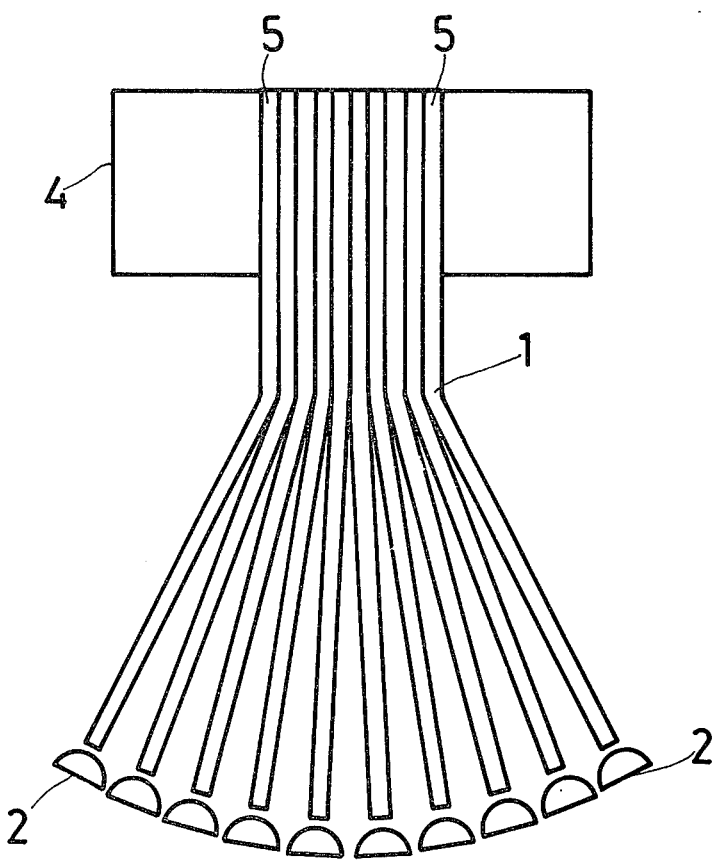
FIG. 1 is a side elevation of sensors according to the invention.
Figure 2:
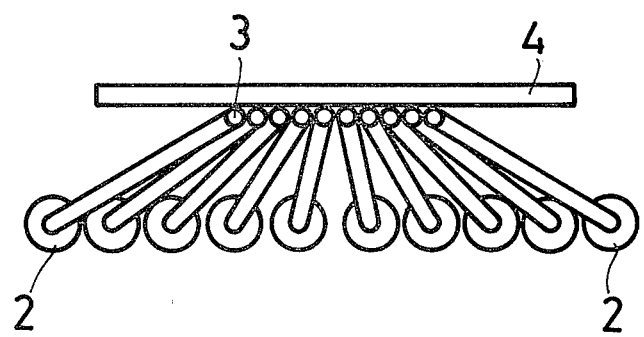
FIG. 2 is a plan view of the sensors of FIG. 1.

Referring now to FIGS. 1 and 2, a sensor comprises an optical fibre 1 leading to a photo sensitive electronic component 2, such as a photo transistor or diode.

A plurality of such sensors are mounted with the optical fibres in a straight line 3 adjacent one another. A support 4 is used to mount the fibres against, and the receiving ends 5 of the fibres are co-planar.

FIG. 3 and 4 shows measuring apparatus according to the invention, excluding any switching means. Sources 6 comprise infra red light emitting diodes arranged in a straight line in plan view in the direction of proposed measurement. In side view, the sources 6 are arranged in an arc above sensors 7. In this embodiment, sixteen sources are used and are numbered from one to sixteen in FIG. 3.

The sensors, of which only the upper portions of the optical fibres 1 are shown are also arranged in a straight line in the direction of measurement.

A moveable mark comprises a radial gap 8 in a rotatable disc 9. The disc is located to rotate such that the gap 8 will move between the sources 6 and the sensors 7. In use, the gap will clearly cause a restriction in the source radiation since the remainder of the disc is opaque; this will result in a slit of light passing through the gap at an angle of inclination to the plane of the disc which is dependant on the source which is radiating at a particular time.

FIGS. 5 and 6 show sixteen sources 6, a rotatable disc 9 and sensors 7 comprising optical fibres 1 and photo sensitive electronic components 2, as above described.

The disc 9 however is translucent, and has opaque graduated radial markings 10 therearound, representing degrees of angular distance about the centre of the disc.

Further, the sensors 7 are at an acute angle to the line covering the shortest distance between two successive marks, as described in the above mentioned co-pending patent application. This is illustrated in FIG. 6.

It will be appreciated that the mark 10 causes a restriction in the width of radiation falling on the sensors since the width of the mark determines the width of the radiation shadow caused by the opaque mark.

As before, the angle at which this shadow falls on the plane of the sensors receiving faces 5 (which is parallel to the plane of the disc) is dependant on which source is radiating at a particular time.

The method of measuring will be described with reference to FIG. 7. Here, a moveable mark comprises a linear gap 11 in an opaque moveable member 12.

Sixteen sources (not shown) are located as above described relative to member 12. Sensors 7 are provided, only sections of the optical fibres 1 being shown on a greatly enlarged scale. These fibres have radiation receiving faces 5 which are co-planar as previously described.

In this particular case, the gap has a width equal to the radius of an optical fibre, and the intensity of the sources and the sensitivity of the photo sensors are arranged so that the sensor will detect radiation if half or more of the area of a fibre face 5 is receiving radiation and will not detect radiation otherwise. In effect, if radiation through the gap covers half or more of a particular fibre, the corresponding photo-transistor or the like will be switched on, otherwise it will be switched 'off'.

Further, the sources are switched in sequence of location in line from one end to the other, in the direction indicated by arrow 13. Clearly, the radiation restriction, being the slit of radiation passing through gap 11, will move in the opposite direction indicated by arrow 14.

Presume that gap 11 is in an initial position having its edges in a position above the sensors indicated by numerals 15.

Now, if source one is on, it radiates infra-red light 16 through the gap to strike the receiving face of a particular fibre 17.

A scale 18 is provided below to enable easy reference to the movements of the radiation restriction and gap 11. Further, the centre of fibre 17 is indicated by numeral 19.

It will be seen from this scale that light 16 strikes the fibre face between '0' and '16' on the scale 18. Since the gap width is one fibre radius, and the light 16 falls wholely on the face of fibre 17, the sensor indicates 'on', since half or more of the sensor face is receiving radiation.

Source one is now switched off, and source two is switched on, and each source in sequence is switched on and off from source one to sixteen. Clearly, if the scale 18, numbered 0 to 16 represents edges of the light slit or restriction, the sensor 17 will indicate 'on' until the first source is switched which will have its right hand edge to the left of half-way mark 19 of fibre 17.

At this position of the light slit, less than half the area of the face of fibre 17 will be covered by radiation.

Presuming each successive source to cause a shift in the radiation slit equal to one increment of the scale 18, the first source that will cause sensor 17 to turn off is source three radiating light 20.

This change occurred between source two and three, and for convenience the numeral 3 is recorded to represent the position of light source corresponding to the change in sensors with gap 11 in position 15.

Assume now the member 12 and its gap 11 has moved on to a position indicated by gap edges 21.

Figure 7:
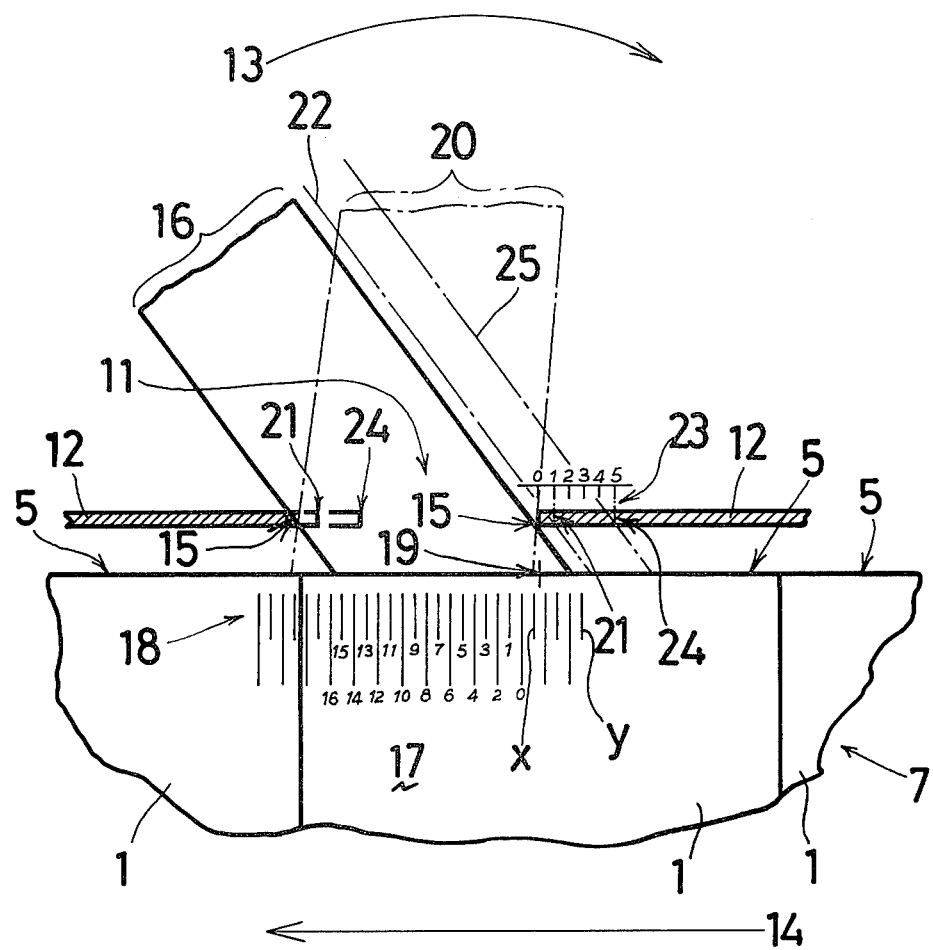
FIG. 7 is an illustrative side view of an embodiment of part of the apparatus on a much enlarged scale.

In this position source one will radiate light having a right hand edge in FIG. 7 indicated by numeral 22, and this coincides with scales 18 graduation 'X'. Clearly, the sensor 17 will indicate on until light sources are switched to move the right hand edge of radiation to the left side of half way mark 19. This will take four increments of scale 18, i.e. source four will cause a change in sensor 17, and the numeral 4 is recorded.

This first recorded numeral is subtracted from the last and 4−3=1, which is the extent to which the member 12 has moved. This is indicated by control scale 23 being an objective scale having graduated increments equal to those of scale 18.

Similarly, should the member 12 move to a position indicated by gap edges 24, source one will radiate infra red light having a right hand edge 25 corresponding to graduation 'Y' on scale 18.

Clearly to cause a change in sensor 17, eight increments on scale 18 in direction 14 are required, and thus source 8 will cause the change and numeral 8 will be recorded. From this, the last recorded numeral (i.e. numeral 4) is subtracted giving an incremental movement of four from the last calculated increment of one; or, an increment of five in total from position 0 on control scale 23.

Presuming that the movement of the member as above described took place between a reference position and a position determined by a measurement being taken, it will be clear that the measurement will be directly proportional to the movement of five scale increments. Further, if the final position is at the measurement desired, the measurement itself will be the five increments. Still further, it will be appreciated that member movement in a direction opposite to that described will result in a subtraction of recorded numerals which will decrease an accumulated total or give a negative quantity, thus clearly indicating the direction of movement.

It will be appreciated by those skilled in the art that the actual value of the increments may be selected, and may be varied by amongst other factors, the number of sources used, the number of sensors used, the distance covered by a complete 'sweep' of light sources over the sensors, and the intensity of the sources and the sensitivity of the sensors.

In regard to the last mentioned factor, it will be clear that if the threshold of sensor switching is decreased from half the receiving area to, say, quarters thereof, i.e. at a quarter, a half and three quarters, double the number of sensor changes will occur and so the measuring resolutions will increase. Further, the intensity at which an individual source radiates may be varied to detect a change of sensor without switching any other source. This means of increasing resolution is more fully described in, and forms the subject matter of, our co-pending South African patent application No. 79/1965 of Apr. 24, 1977 entitled "Method and Apparatus for determining the location of graduated marks in measuring applications".

In particular, when a change occurs between two sources, the first source may be re-switched and have its intensity increased until the change recurs, or the second source may have its intensity decreased until the change is reversed. This enables further resolution to be obtained in the distance corresponding to changes between two sources in the switching sequence.

The present invention provides for the switching means to be electronic circuitry and for the recording of sources corresponding to sensor changes and any arithmetic calculation to be performed by electronic circuitry, which may or may not be programmable.

One application of the invention is the measurement of angular distance as required for example in surveying work. The discs described above may be included in a theodolite, and disc movement will then take place from one sighting position (being the reference) to another (being the disc position which will determine the final position of the marks thereon).

In this application it is convenient that the width of a radiation restriction is arranged to be equal to $\frac{1}{2}R+nR$, where: R is half the perpendicular distance in a direction of measurement between lines running through the centres of two successive fibres. Where the fibres are in fact arranged in a straight line in the direction of measurement, R simplifies to be equal to one fibre radius; and n is a positive integral number.

The above applies for reasons of convenience if the threshold of sensor switching is one half of a sensor receiving area, since it is desirable to have the radiation restriction width corresponding to the sensor sensitivity for maximum resolution. Clearly if the switching threshold is on quarters, the desirable radiation restriction width would include so much of a fibre radius as would give one quarter of the fibre receiving area, plus a suitable integral number of fibres.

With sources arranged as above described, being sixteen in number, and being arranged so that with each successive switching the radiation restriction moves a distance of R/32 over the sensors, it will be seen that the total movement or 'sweep distance' of the bank of sources is R/2.

Therefore the angular rotation of the disc from an initial position to a position determined by a measurement is determinable to one part in $Sn \times Fn \times N \times 2$ of a full circle. where:

$Sn$ = Number of light sources;
$N$ = Number of marks; and
$Fn$ = Number of optic fibres (or sensors) between two successive marks Thus given 16 sources, 360 marks, and 30 optic fibres, a resolution of 3.75 seconds of arc of rotation is possible.

This applies provided the speed of rotation of a disc is limited such that a complete cycle of sequential switching can be completed within one increment i.e. 3.75 seconds; the frequency of switching required to achieve this is well within the capability of electronic switching means for the application in question.

Figure 8:
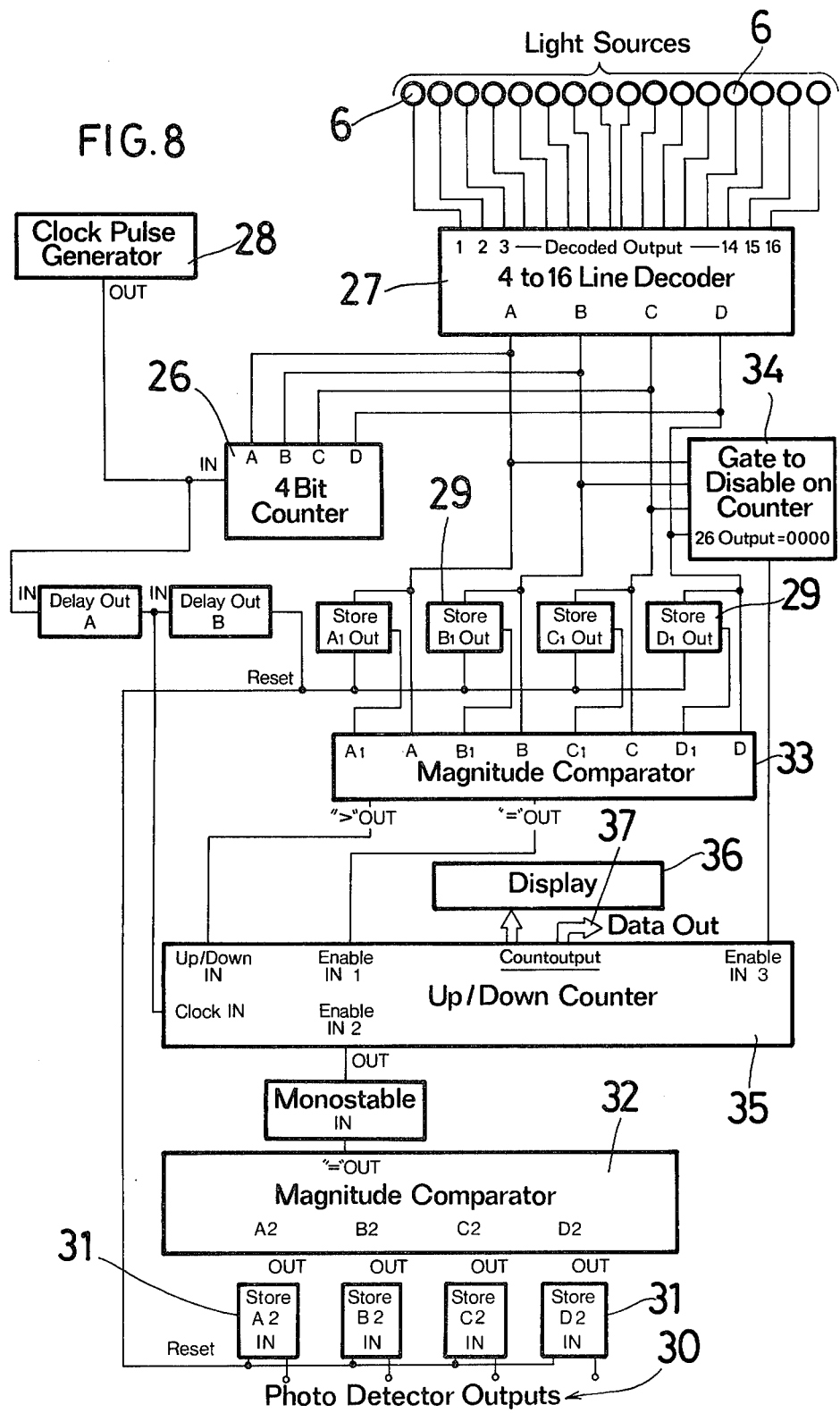
FIG. 8 is a schematic block diagram of electronic circuitry according to the invention.

Finally, FIG. 8 shows a schematic block diagram of electronic circuitry according to the invention. Radiation sources 6 are driven to switch sequentially from a 4-bit counter 26 via a 4 to 16 line decoder 27, the counter being clocked by a pulse generator 28 of suitable frequency.

As the sources are switched, the source switch at a particular time is stored in latches 29.

The photo sensitive component outputs 30 (indicating either an 'on' or an 'off' i.e. a logical one or zero) are stored in latches 31.

Both the stored sensor pulses and the stored source switching information are fed into magnitude comparators being comparators 32 and 33 respectively. These comparators compare each successive input to the last recorded input to determine whether a change has occurred in sensors, and if so which source was responsible therefor. The up/down counter is disabled, when counter 26 has an output of 0000, by gate 34.

The outputs from the comparators are taken to an up/down counter 35 which counts up to each positive change and down for each negative change as described with reference to FIG. 7.

The measured result is displayed by a display means 36 and the display data may also be taken out, indicated by numeral 37, to a further processing means if desired.

In regard to the last mentioned aspect, this processing means may be used to calculate desired results from a plurality of theodolites situated apart from each other. For example if sitings from two theodolites at known locations are taken to an unknown location, the data from the two theodolites may be used to positively locate the unknown location. The data may be sent via co-axial cable or even radio, and the pin-pointing of an unknown location in practically the time taken to take two sightings, could be of importance not only in surveying applications, but for example, in military operations.

Many variations can be made to the above embodiments without departing from the scope of the invention. Visible light may be used in place of infra-red or any suitable electro-magnetic radiation used. The sensors will vary widely with requirements as to accuracy, the number to be fitted between successive marks and the radiation used. The switching need not be in the sequence described, and as long as at least each source is switched in a cycle, two or more sources may be on at a given time and the sequence need not be predetermined.

What we claim as new and desire to secure by Letters Patent is:

1. A method of measuring comprising the steps of:
   directing each of a plurality of sources of electromagnetic radiation, having a predetermined displacement relative to each other in a direction of measurement, to radiate over the receiving areas of a plurality of electro-magnetic radiation sensors also having a predetermined displacement relative to each other in a direction of measurement;
   sequentially switching the sources;
   moving at least one mark between the sources and the sensors, the mark causing a restriction in a cross-section measurement of the radiation passing beyond it, and the mark moving in a direction of measurement from a reference position to a position determined by the measurement being taken;
   detecting any changes in the sensors as a result of movement of the radiation restriction caused by movement of the mark and the switching of the sources;
   noting between the switching of which sources each such change occurred; and,
   ascertaining what distance the radiation restriction moved to cause the change to occur between the noted sources.

2. A method as claimed in claim 1 in which the radiation is directed from sources located in line in the direction of measurement.

3. A method as claimed in claim 2 in which the radiation is directed from sources arranged in arcuate fashion above the sensors.

4. A method as claimed in claim 2 in which the sources are switched in the sequence of their location in the direction of measurement.

5. A method as claimed in claim 1 in which a change in a sensor is detected when radiation falling thereon increases to cover at least half of the sensor's receiving area.

6. A method as claimed in claim 1 in which the direction of movement of changes in sensors, relative to the direction of measurement is noted.

7. Measuring apparatus comprising:
   a plurality of sources of electromagnetic radiation having a predetermined displacement relative to each other in a direction of measurement;
   a plurality of electromagnetic radiation sensors having a predetermined displacement relative to each other in a direction of measurement;
   means adapted to sequentially switch the sources;
   at least one movable mark adapted to move in a direction of measurement between said sources and sensors from a reference position to a position determined by the measurement being taken, the mark being further adapted to cause a restriction in a cross-sectional measurement of the radiation passing beyond it in use; and
   detection means adapted to detect any changes in the sensors as a result of movement of the radiation restriction caused by movement of the mark and the switching of the sources; the arrangement being such that each of the sources are directed to radiate over the receiving areas of the sensors.

8. Apparatus as claimed in claim 7 in which the sensors comprise optical fibres having coplanar radiation receiving ends, the other ends thereof being lead away to photo-sensitive electronic components.

9. Apparatus as claimed in claim 7 in which the sources are arranged in line in the direction of measurements and in arcuate fashion over the sensors.

10. Apparatus as claimed in claim 7 in which the sources emit infra-red light radiation.

11. Apparatus as claimed in claim 10 in which the sources are infra-red light emitting diodes.

12. Apparatus as claimed in claim 7 in which the mark is a line having clearly defined sides and being substantially opaque to the radiation used.

* * * * *